(12) United States Patent
Boucher et al.

(10) Patent No.: US 6,745,368 B1
(45) Date of Patent: Jun. 1, 2004

(54) METHODS, APPARATUS, AND SYSTEMS FOR STORING, RETRIEVING AND PLAYING MULTIMEDIA DATA

(75) Inventors: Antoine Boucher, London (CA); Paul E. McRae, London (CA); Peter G. N. Scheyen, London (CA)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/330,904

(22) Filed: Jun. 11, 1999

(51) Int. Cl.$^7$ .............................................. G06F 15/00
(52) U.S. Cl. ............................... 715/500.1; 715/501.1; 715/513; 725/114; 725/110
(58) Field of Search .................... 707/501.1; 715/501.1, 715/500.1, 513; 725/110, 114

(56) References Cited

U.S. PATENT DOCUMENTS

| | | | | |
|---|---|---|---|---|
| 5,053,761 A | * | 10/1991 | Webster, III. | 345/590 |
| 5,530,799 A | | 6/1996 | Marsh et al. | 395/164 |
| 5,883,640 A | * | 3/1999 | Hsieh et al. | 345/467 |
| 6,049,831 A | * | 4/2000 | Gardell et al. | 709/236 |
| 6,311,197 B2 | * | 10/2001 | Mighdoll et al. | 707/513 |
| 6,397,217 B1 | * | 5/2002 | Melbin | 707/10 |
| 6,411,724 B1 | * | 6/2002 | Vaithilingam et al. | 382/100 |

FOREIGN PATENT DOCUMENTS

EP 0817 103 A2 1/1998

OTHER PUBLICATIONS

Liao, T: "WebCanal: a multicast Web application" Computer Networks and ISDN Systems, Norh Holland Publishing. Amsterdam NL,. vol. 29, No.8–13, Sep. 1, 1997, pp. 1091–1102, XP004095307, ISSN 0169–7552.

\* cited by examiner

Primary Examiner—Stephen S. Hong
Assistant Examiner—Adam Queler
(74) Attorney, Agent, or Firm—Allan Jacobson

(57) ABSTRACT

Various embodiments of the invention provide increased speed and decreased computer processing for playing and navigating multimedia content by using two types of data objects for displaying the multimedia content. The first data object type includes rendered multimedia content data. The second data object type provides semantic content corresponding to the rendered multimedia content. The storage medium in which these two types of data objects are contained is referred to as a rendered cache. The semantic content can include locations, sizes, shapes, and target universal resource identifiers of hyperlinks, multimedia element timing, and other content play instructions. The very fast play of content stored in the rendered cache is due to the elimination of the steps of laying out the content, rendering the content, and generating the semantic representation of the content. These steps are required each time the content is played after retrieval from a conventional cache. The only steps required for playing content from the rendered cache are to read the rendered content, read the semantic content, restore the semantic representation, and play the content. A traditional web browser visiting a web site that resides in a rendered cache provides an almost instantaneous display of the web site. The caching mechanism provided by various embodiments of the invention is independent of content file format and the stored semantic content file format. As long as a client application, such as a content browser, can recognize and play the multimedia content and recognize and interpret the semantic content, the application can realize the benefits provided by the rendered cache.

16 Claims, 11 Drawing Sheets

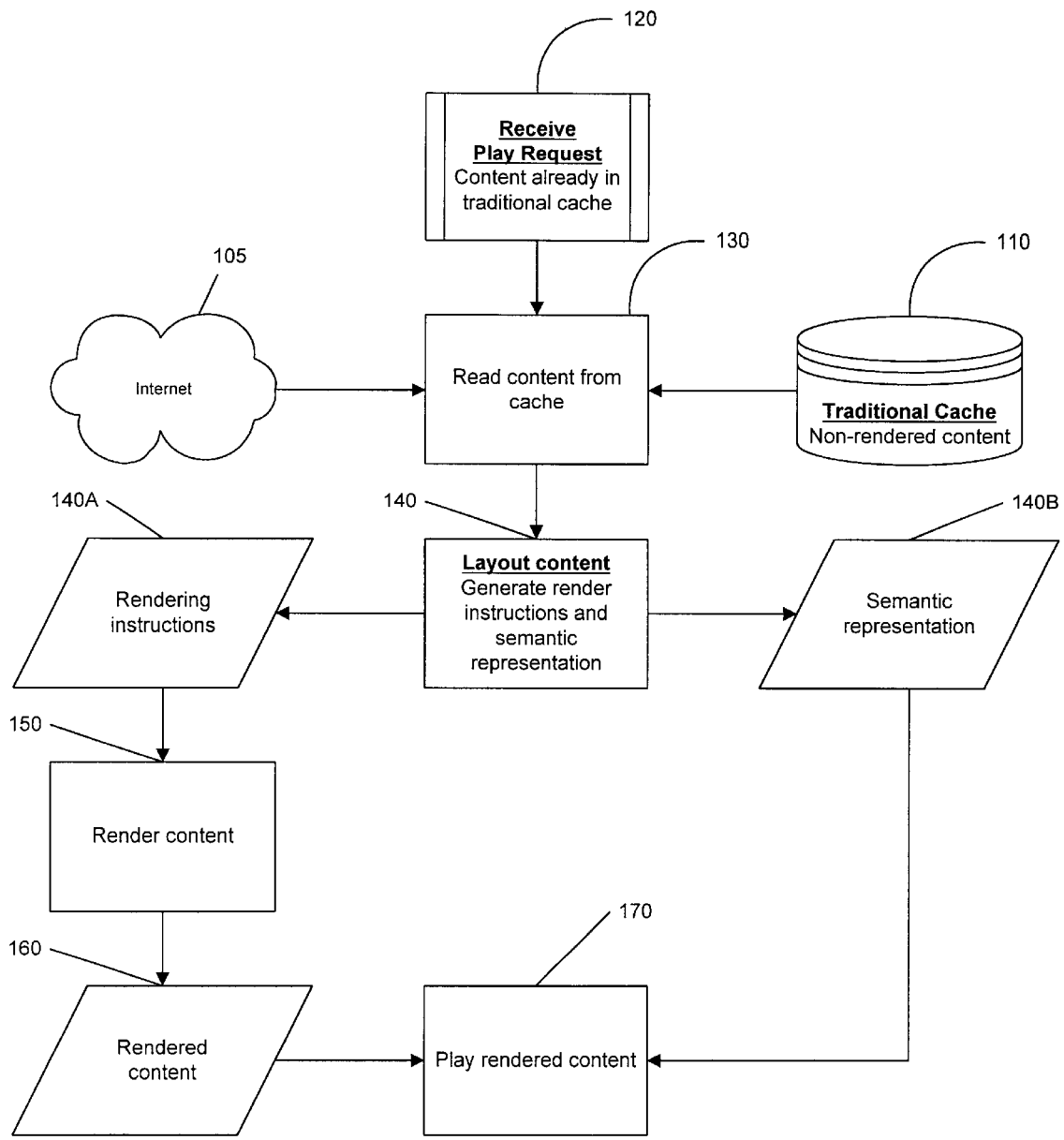
Fig. 1: Prior Art Process Details

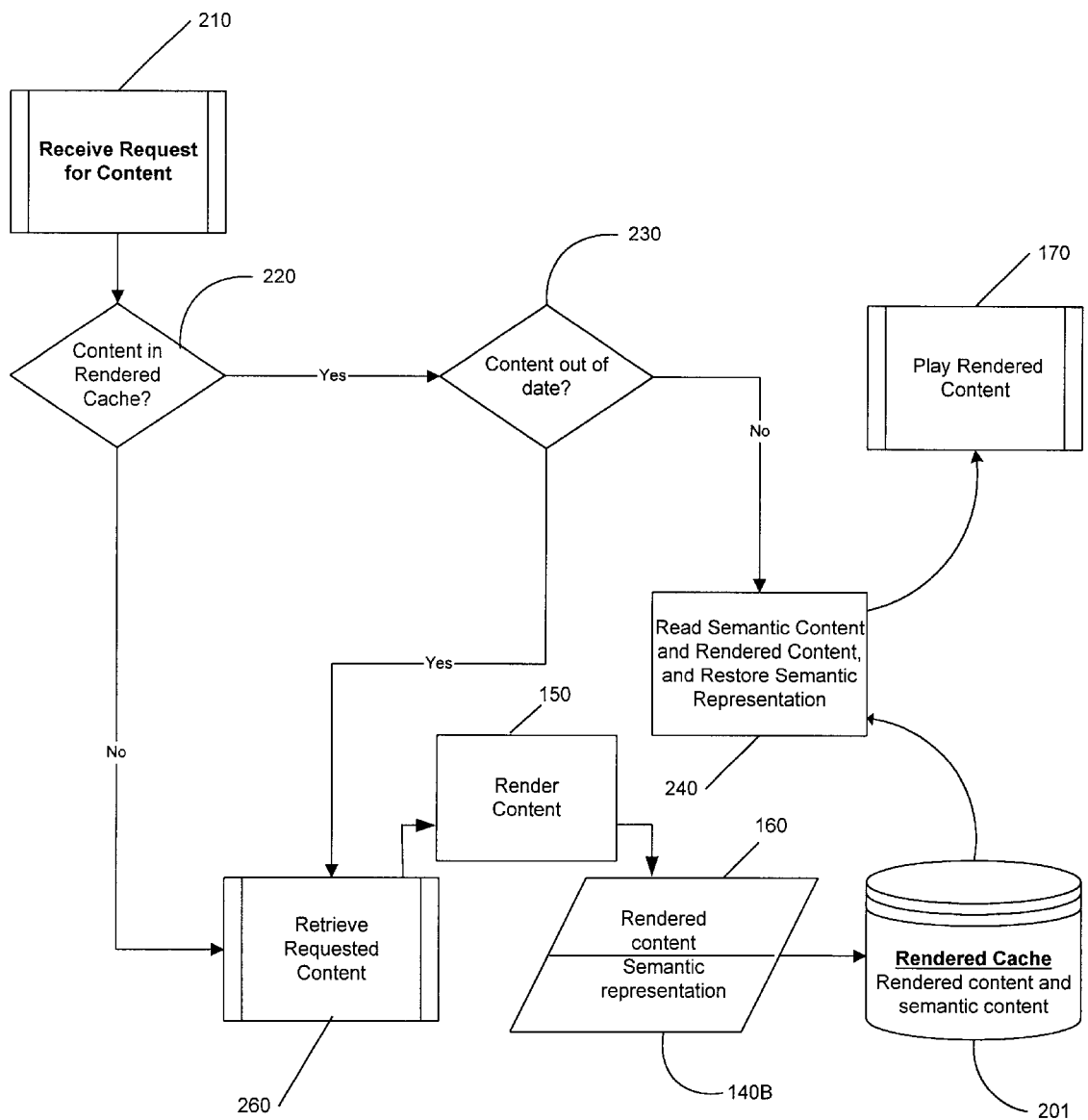
Fig. 2: Rendered Cache Process Overview

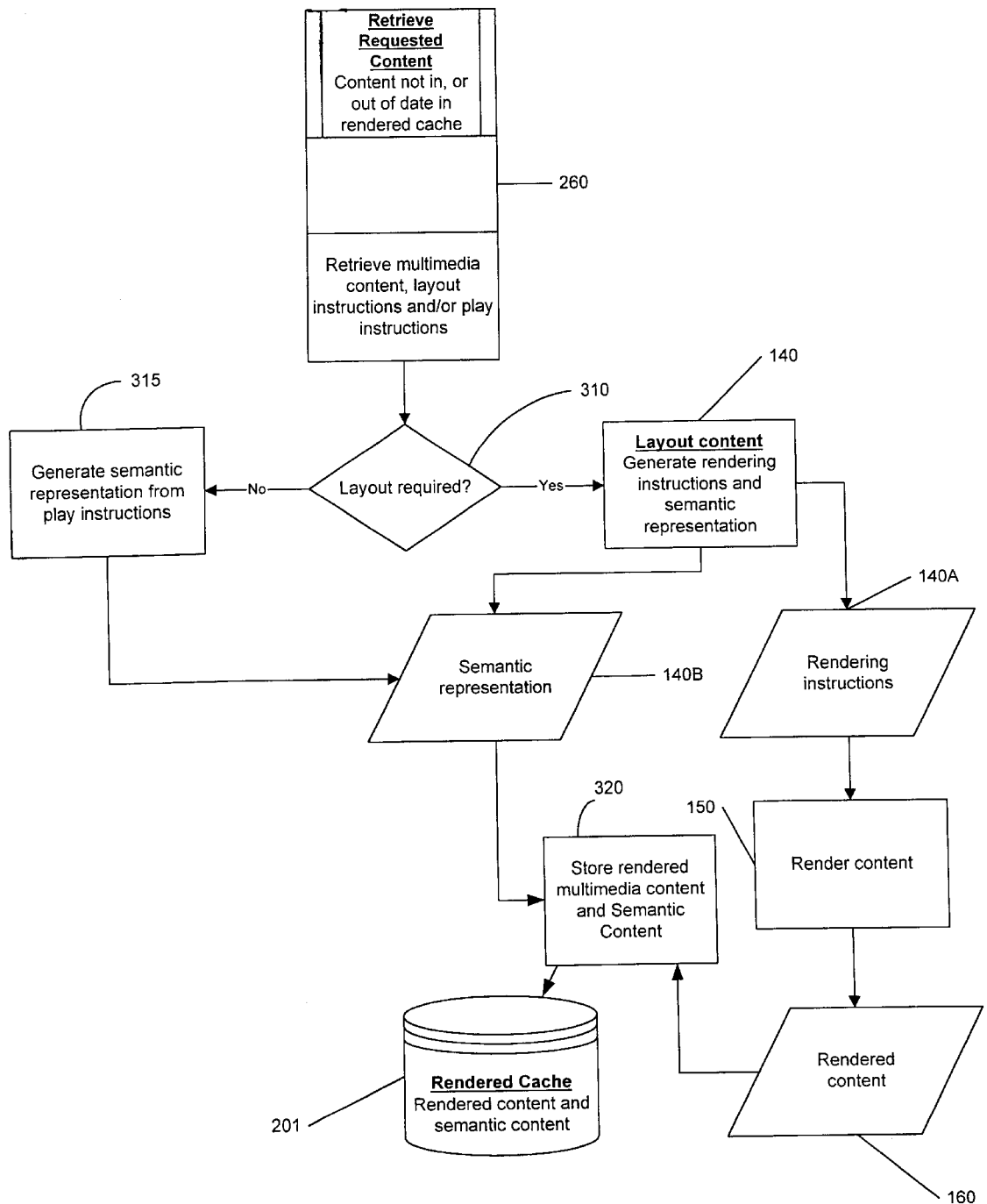
Fig. 3: Render Process Details

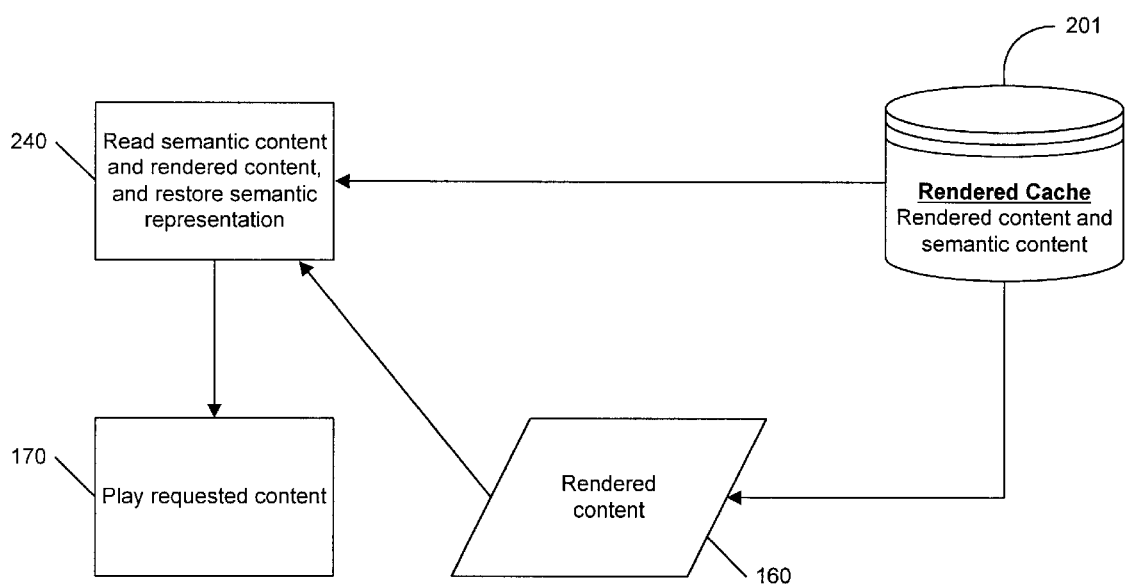
Fig. 4: Play Process Details

FIG. 5A

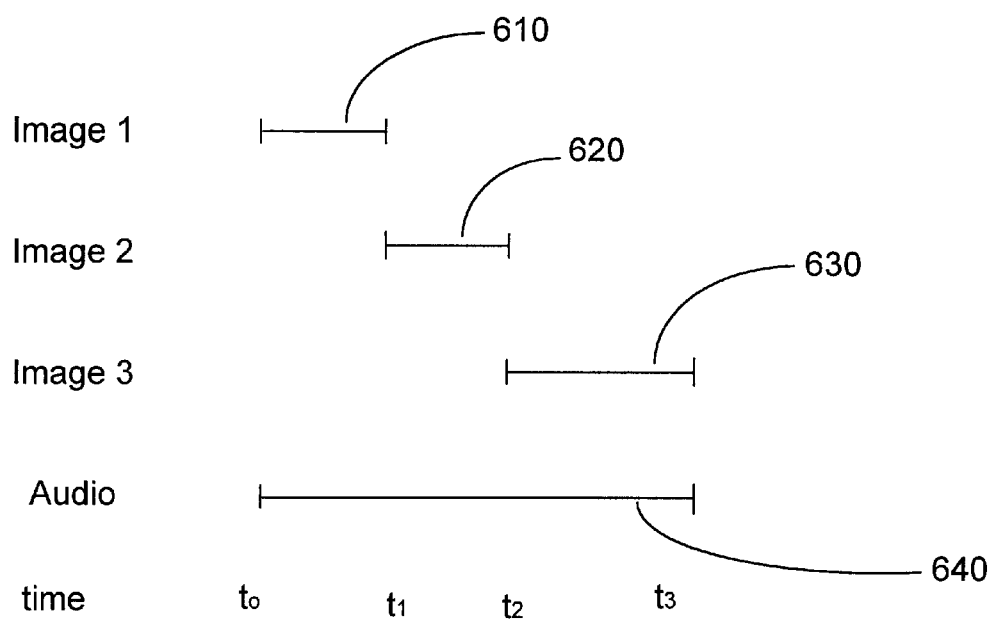
Fig 6A: Presentation timeline

METHODS, APPARATUS, AND SYSTEMS FOR STORING, RETRIEVING AND PLAYING MULTIMEDIA DATA

CROSS-REFERENCES TO RELATED APPLICATIONS

This application relates and incorporates herein by reference as if fully set forth herein U.S. patent application Ser. No. 09/071,549, entitled "Labelling of Links in Hypertext Document Images," filed, May 1, 1998, and having inventors Antoine Boucher, Wayne C. Louie, Paul E. McRae, and Peter G. N. Scheyen; U.S. patent application Ser. No. 09/255,052, entitled "System and Method for Interactive Distribution of Selectable Presentations," filed Feb. 22, 1999, and having inventors: Antoine Boucher, James Lee Fischer, and Allan E. Lodberg; and U.S. patent application Ser. No. 09/287,235, entitled "System and Methods for Preparing Multimedia Data Using Digital Video Data Compression", filed Apr. 6, 1999, and having inventors Antoine Boucher, Paul E. McRae, and Tong Qiu; the entire contents of all of which are hereby incorporated herein by reference as if fully set forth herein.

BACKGROUND OF THE INVENTION

1. Field of the Invention

The invention relates generally to improvements in computer systems. More particularly, the invention relates to methods, apparatus, and systems storing multimedia content such as audio, text, image, and graphical content in a cache directory.

2. Discussion of the Related Art

Prior art graphics processing storage medium, sometimes called a cache system, is known to those skilled in the art. For example, a conventional caching system is typically composed of a small fast storage device that contains a "snapshot" of information originally received from a larger, slower source. The snapshot is considered by the particular implementation to be the most relevant information to the processing occurring during the current time period.

In the context of Internet content, a "cache" is a file, database, directory, or set of directories disposed in a computer file system. The cache stores content that has been previously retrieved generated or otherwise produced. Internet browsers and editors use cache directories to store content. The cached content is used in place of remote content whenever possible in order to decrease retrieval latencies. Therefore, many web browsers and text editors save Internet and other text and graphical content in a cache directory in order to reduce access times. This content is usually stored in its original form [for example, hypertext markup language (HTML) and accompanying images].

A problem with this technology has been that to view content based on the image data stored in the cache typically requires layout and rendering of the data. If the data upon which content is based does not change, the process of rendering need only occur once to a display buffer. When information is changed, the information must be re-rendered to reflect the desired change. For complex graphics scenes re-rendering can require massive processing for only incremental changes in the scene or particular graphic. The layout and rendering processes are time consuming and require processor resources. Therefore, what is required is solution that provides play of multimedia content more efficiently in terms of time and processor resources.

Heretofore, the requirements of timely and processor efficient play of multimedia content have not been fully met. What is needed is a solution that simultaneously addresses these requirements. The invention is directed to meeting these requirements, among others.

SUMMARY OF THE INVENTION

A primary goal of the invention is to provide timely and processor efficient display of multimedia content. In accordance with these goals, there is a particular need for a storage medium that includes multimedia content and the semantic content of the multimedia content. A storage medium including both the multimedia content and the semantic content is referred to herein as a rendered cache.

For various embodiments of the invention, the semantic content can include locations, sizes, shapes, and target universal resource identifiers of hyperlinks, multimedia element timing, and other content play instructions. The very fast play of content stored in the rendered cache is due to the elimination of the steps of laying out the content, rendering the content, and generating the semantic representation of the content. These steps are required each time the content is played after retrieval from a conventional cache. The only steps required for playing content from the rendered cache are to read the rendered content, read the semantic content, restore the semantic representation, and play the content.

A traditional web browser visiting a web site that resides in a rendered cache provides an almost instantaneous display of the web site. The caching mechanism provided by various embodiments of the invention is independent of content file format and the stored semantic content file format. As long as a client application, such as a content browser, can recognize and play the multimedia content and recognize and interpret the semantic content, the application can realize the benefits provided by the rendered cache. Thus, it is possible to simultaneously satisfy the above-discussed requirements of timely and processor efficient display of multimedia content, which, in the case of the prior art, are not simultaneously satisfied.

A first aspect of the invention is provided as an embodiment that is based on a method, implemented in at least one computer, for storing multimedia data. The method for storing multimedia data comprises detecting multimedia content, generating a semantic representation of a rendered representation of the multimedia content from the play instructions, storing the rendered representation in a storage medium, and storing data corresponding to the semantic representation in the storage medium. The multimedia content includes play instructions and at least one multimedia element. The at least one multimedia element includes at least one of graphical images, audio, text, and full motion video. The play instructions include at least one of timing of the multimedia content and ordering of the multimedia content. The semantic representation describes at least one of characteristics of the rendered representation, and relationships between different multimedia elements disposed in the rendered representation.

A second aspect of the invention is provided as an embodiment that is based on a method, implemented in at least one computer, for storing multimedia data. The method for storing multimedia data comprises detecting multimedia content including layout instructions, and laying out the multimedia content according to the layout instructions to form rendering instructions and a semantic representation of a rendered representation of the multimedia content. The method also includes rendering the multimedia content according to the rendering instructions to produce the rendered representation, storing the rendered representation in a storage medium, and storing data corresponding to the semantic representation in the storage medium.

A third aspect of the invention is provided as an embodiment that is based on a method, implemented in at least one computer, for retrieving multimedia data. The method for retrieving multimedia data comprises processing resources of a first computer of the at least one computer detecting a request for requested multimedia content, and processing resources coupled with the first computer determining whether data corresponding to the requested multimedia content is disposed in a storage medium. The storage medium is coupled with the first computer and includes rendered representations of multimedia content and semantic content. Embodiments according to the third aspect of the invention also include responding to a determination that data corresponding to the requested multimedia content are disposed in the storage medium by retrieving a rendered representation of the requested multimedia content; and retrieving semantic content corresponding to the requested multimedia content.

A fourth aspect of the invention is implemented in an embodiment that is based on a rendered cache comprising a storage medium, and an indexing mechanism adapted to store and retrieve a rendered representation of the multimedia content formatted for rapid play and semantic content of the multimedia content.

A fifth aspect of the invention is implemented in an embodiment that is based on a client. The client comprises processing resources adapted to detect a rendered representation of multimedia content and semantic content of the rendered representations, and processing resources adapted to respond to detecting the rendered representation of the multimedia content and the semantic content by playing at least a portion of the rendered representation according to the semantic content.

A sixth aspect of the invention is implemented in an embodiment that is based on a system for using multimedia content. The system comprises web crawler processing resources adapted to access the multimedia content from source data storage, rendering processing resources, and a rendered cache as described above as the fourth aspect of the invention. The rendering processing resources are adapted to generate a semantic representation of a rendered representation of the multimedia content, and format the semantic representation as semantic content, and render the multimedia content into the rendered representation, the rendered representation is formatted for rapid play.

A seventh aspect of the invention is implemented in an embodiment that is based on a system for accessing multimedia content. The system for accessing multimedia comprises a rendered cache as described above as the fourth aspect of the invention, and rendering processing resources adapted to convert the multimedia content into the rendered representation, the rendered representation is formatted for rapid play, and create a graphical representation of the multimedia content.

An eighth aspect of the invention is implemented in a method for playing multimedia content. The method comprises retrieving a rendered representation of the multimedia content from a storage medium, and retrieving semantic content of the rendered representation from the storage medium. The method includes browser processing resources reading the rendered representation and the semantic content, and the browser processing resources restoring a semantic representation based on the semantic content. The method includes the browser processing resources transmitting an active portion of the rendered representation to a client, and transmitting an active portion of the semantic content corresponding to the active portion of the rendered representation to the client. The active portion of the rendered representation is one of a portion of the rendered representation presently being played, and a portion of the rendered representation to be played rapidly after transmitting. The method also includes client processing resources detecting the active portion of the rendered representation and the active portion of the semantic content, and the client processing resources playing the active portion of the rendered representation.

BRIEF DESCRIPTION OF THE DRAWINGS

These, and other, goals and aspects of the invention will be better appreciated and understood when considered in conjunction with the following description and the accompanying drawings. Various embodiments of the invention are illustrated in the drawings accompanying and forming a part of this specification, wherein like reference characters (if they occur in more than one view) designate the same parts. It should be noted that the features illustrated in the drawings are not necessarily drawn to scale.

FIG. 1 illustrates a schematic block diagram of a conventional method for retrieving and playing multimedia content, appropriately labeled "PRIOR ART".

FIG. 2 illustrates a schematic block diagram of a process overview for retrieving and playing multimedia content using a rendered cache, representing an embodiment of the invention.

FIG. 3 illustrates a schematic block diagram including render process details, representing an embodiment of the invention.

FIG. 4 illustrates a schematic block diagram including play process details, representing an embodiment of the invention.

Figure 5A:
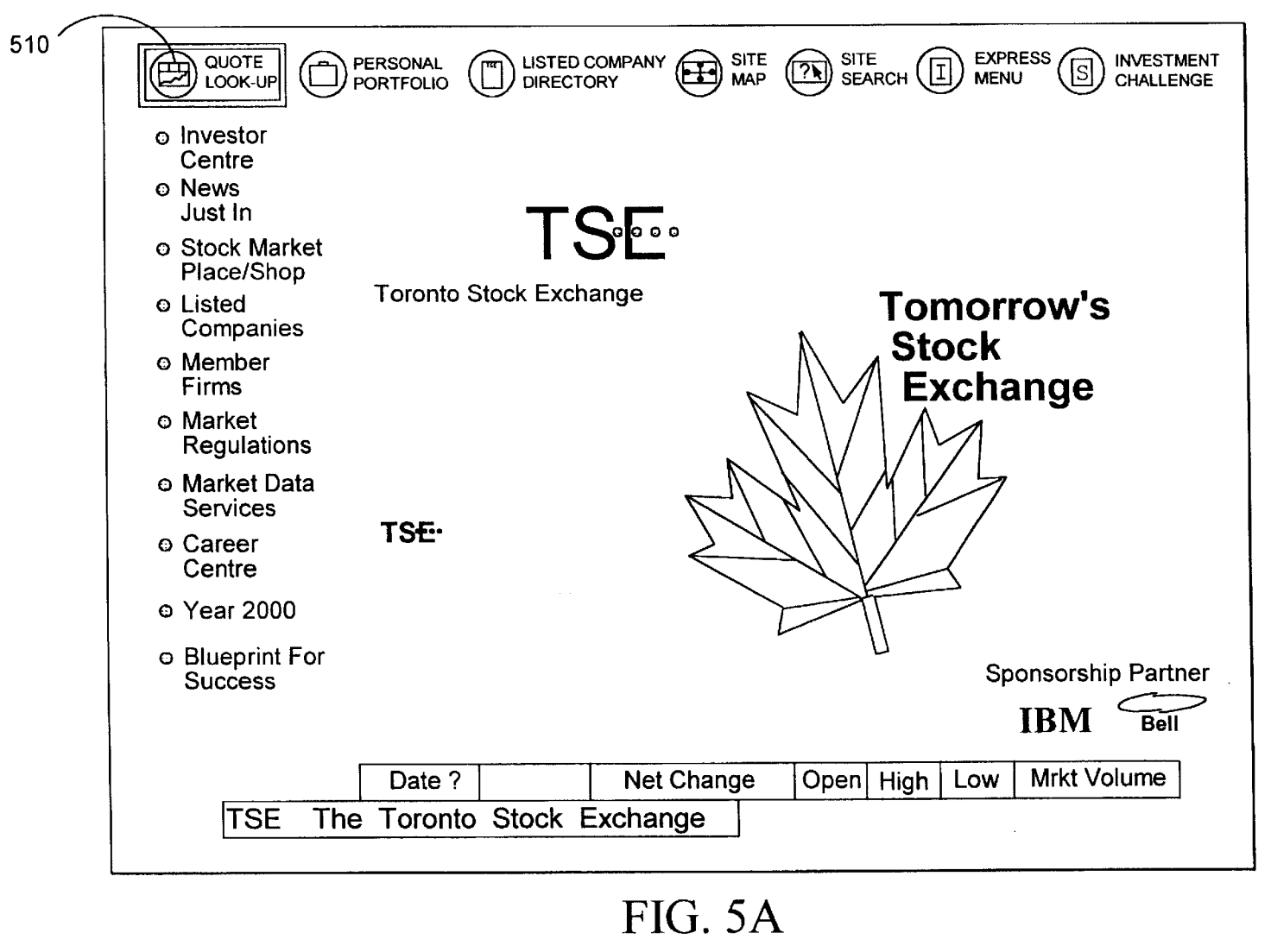

FIGS. 5A–5B illustrate screen shots of portions of a Toronto Exchange Internet page, representing an embodiment of the invention.

FIG. 6A illustrates the timing of play of different multimedia elements for an example of multimedia content that does not require layout, representing an embodiment of the invention.

DESCRIPTION OF PREFERRED EMBODIMENTS

Figure 5B:

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

Methods, apparatus and systems are described for storing multimedia content using a process for caching fully rendered documents in a way that significantly increases content viewing speeds, navigation in a hyperlink document, while decreasing processing requirements.

Definitions

The following terms are used in the description of various embodiments of the invention provided herein.

Content: Text and graphical information that require a layout and/or rendering process in order to be viewed on a computer, television or other display device. Other terms for content include web-page, document, Internet content, hypertext markup language (HTML), eXtensible Markup Language (XML), and Television Markup Language (TVML). Content can also include non-graphical information such as audio.

Content Browser: A computer program designed to retrieve, display or navigate content. Examples include Internet web browsers, HTML/XML/Standard Generalized Markup Language (SGML) editors, word processors, and Internet web proxies.

HTML: The de facto Internet content standard. HTML includes a set of markup rules that describe the layout of Internet content. Browsers use this markup to layout and render the HTML for viewing computer monitors, televisions, or other displays.

Markup: Notation used to describe the syntactic and semantic features of a content document.

Multimedia Content: Multimedia elements used for playing a presentation for a user. The multimedia elements can include graphical images (including rendered HTML), audio, text, and full motion video.

Navigation: The process of selecting an indexing indication, such as a URI in the form of a hyperlink, from displayed content to access further content.

Presentation: Content that references at least one multimedia element. Presentations include play instructions that can be used to define the timing, order, and position of the multimedia plays. The play instructions can include the size, shape and target of all hyperlinks, information on interactive elements (like HTML forms), and Meta values.

Render: The process of generating a graphical representation of data that can be viewed on a display. For example, web browsers render HTML pages into graphical images that can be viewed on a computer monitor or television. Also the process of generating or converting multimedia data (images, audio, text, full motion video) into a format that can be played.

Rendered Cache: Various embodiments of the invention use the concept of a rendered cache to mean a cache of content that is not only generated (or retrieved) from a multimedia content data source, such as the Internet; but also is rendered and ready for rapid play. The rendered cache can include two types of objects: multimedia content and semantic content. The multimedia content stored in the rendered cache is content that has been rendered and is ready for very quick display. Semantic content includes a description of the semantic features or representation of the rendered content. Examples of semantic features include the location, size, shape and target of hyperlinks, the timing, location, and size of animated graphics interchange format (GIF) frames, the size and relative location of HTML frames, information on HTML forms, HTML meta values, presentation play timing, and other play instructions. A more detailed description of the rendered cache is provided in the Process Description section below.

Semantic Representation: A description of the characteristics, attributes, logical structure, and features of multimedia elements (or objects) that form a rendered representation of multimedia content, or a portion thereof. The data can also describe the relationships between different multimedia elements within a particular presentation portion, and the way various elements of the multimedia content are accessed and manipulated. The semantic representation is typically generated during the layout process and is structured such that the semantic representation can be saved as formatted and indexed semantic content in a file or database, and rapidly restored from the semantic content. The semantic content can be stored along with the multimedia content or as one or more separate indexed files. The semantic representation is independent of the format of the stored semantic content. The Document Object Model (DOM) is one type of semantic representation and is adapted for use with HTML and XML documents.

TVML: Some embodiments of the invention (including the VirtualModem™ presentation system provided by Interactive Channel, Inc. located in London, Ontario, Canada) use an XML language called television markup language (TVML) to describe multimedia content. TVML includes markup to describe how to play multimedia content. The multimedia content can include text (including HTML), graphical images, audio, text, and full-motion video. TVML can include markup to describe when each multimedia component should be played relative to the other multimedia components.

URI: A Universal Resource Identifier (or URI) is an Internet standard term for all types of names and addresses that refer to content. The term URI encompasses terms such as filename, hyperlink, and Universal Resource Locator (URL).

VMML: An XML markup language (called VMML—VirtualModem™ Markup Language) used to store semantic representations of rendered multimedia content by various embodiments of the invention, such as the VirtualModem™ presentation system.

XML: A markup language used to describe other markup languages, such as HTML and TVML.

Process Description

Various embodiments of the invention include methods, implemented in at least one computer, for storing and retrieving multimedia data. These methods navigate and play multimedia content with increased speed and decreased computer processing by using different types of data objects to represent the multimedia data. A first data object type includes pre-rendered multimedia content data. A second data object type includes a semantic representation of the pre-rendered multimedia content. These data object types can be stored as separate files or can be contained in the same file.

Prior art methods for retrieving and playing multimedia content are represented by FIG. 1, which includes a traditional cache 110. After detecting a request to play multimedia content (at step 120), retrieving processing resources, such as those disposed in a web browser, retrieve the corresponding multimedia content data. A traditional web browser, such as Netscape Navigator, Netscape Communicator, or Microsoft® Internet Explorer, when coupled with a traditional cache 110, then performs the steps described below in response to each and every play request 120.

After retrieving the content (e.g., the HTML content description), the content is read (step 130) from either a traditional cache 110, an Internet 105, or another content data source. Processing resources disposed in a computer can layout the content (step 140), e.g., according to the content's HTML description. During the layout 140, the processing resources generate rendering instructions 140A and derive a semantic representation 140B of the multimedia content. Note that for some embodiments, layout 140 is not required. For these embodiments, the semantic representation 140B can be generated from play instructions, as shown in FIG. 3 (at step 315).

Content browsers can use the semantic representation 140B to determine location, size, shape and targets of hyperlinks; and content play instructions. The semantic representation 140B can also be used to describe other interactive presentation elements, e.g., HTML forms. The semantic features corresponding to the depicted graphical representation generated for play when using traditional content browsers coupled with traditional caches 110 persist only as long as the content is being viewed. Because the semantic features must be present whenever the multimedia content is played, and because traditional caches 110 store the multimedia content in a non-rendered original form, traditional browsers must re-render the graphical representations each time a user requests the content, as shown in FIG. 1.

A render engine then renders the multimedia content (at step 150) according to the rendering instructions 140A to form rendered content 160 (otherwise referred to herein as the rendered representation of the multimedia content). Finally, a multimedia play engine uses both the rendered content 160 and the semantic representation 140B to play the rendered content (at step 170). For multimedia content including images, the playing 170 includes displaying the rendered image on a user screen according to the semantic representation 140B. The rendered content 160 is also referred to herein as a rendered representation of the multimedia content.

In prior art implementations, playing 170 occurs after layout 140 (or other process in which the semantic representation 140B is generated), and rendering 150 have been completed. Rendering 150 and generation of the semantic representation 140B require a relatively long time between when the play request 120 is received and when multimedia content is played 170 compared to the time required to play content using various method embodiments of the invention. Also, greater data processing is required for rendering 150 and generation of the semantic representation 140B for the multimedia content than the processing required for play 170 using various method embodiments of the invention.

The details of retrieving (step 260), rendering 150, and playing 170 multimedia content for some embodiments of the invention are illustrated in FIGS. 2 through 4. FIG. 2 provides an overview of the retrieving 260, and the playing 170 processes for multimedia content, e.g., HTML content, using a rendered cache 201. The methods can be implemented in at least one computer having one or more programs for retrieving and playing multimedia content. The benefits of using the rendered cache 201 for subsequent access to the same multimedia content are also described below.

The rendered cache 201 includes not only rendered content 160 (which can include image data) but also some means of reconstructing the semantic representation 140B of the multimedia data. The reconstruction of the semantic representation 140B can be done using proprietary image formats or separate files that describe the semantic features. This semantic representation 140B can include locations, sizes, and destinations of hyperlinks, descriptions of animations or other dynamic content, and other "meta" information. Meta information can include tagging, refresh (client pull replacement), Meta lists, and platform for Internet content selection (PICS) association labels.

Some embodiments of the invention (including VirtualModem™ interactive presentation systems provided by Interactive Channel Technologies, Inc. located in London, Ontario, Canada) use an XML language called VMML to store the semantic content. The VMML semantic content can include markup to represent the following semantic features of the rendered content 160:

1. Location, size, shape, and target indices (such as URI) of hyperlinks,
2. Size and relative location of HTML frames in the rendered image,
3. Size, location, and timing of animated GIFs,
4. Size, location, and type of HTML form elements,
5. Timing of multimedia content elements, and
6. Other play 170 instructions.

Proper use of content from a rendered cache 201 eliminates the steps of generating a semantic representation 140B, layout 140 (when needed), and rendering 150. On the other hand traditional web browsers using traditional caching mechanisms must perform these steps before playing 170 the content. Eliminating these steps reduces the time and use of processing resources required for playing 170 the multimedia content.

A rendered cache 201 can include of two types of data objects: multimedia content and semantic content. The content can be stored 320 in any format (i.e., the caching mechanism is independent of file format). Typically, the layout 140 and/or rendering 150 processing resources format the semantic presentation 140B for storage in the rendered cache 201 as semantic content. Alternatively, the layout 140 and/or rendering 150 processing resources can transfer the semantic presentation 140B to rendered cache 201 server processing resources which then format the semantic presentation into semantic content to be stored in properly indexed files for retrieval 260. For some embodiments of the invention, content browsers (and/or other client applications using content from the rendered cache 201) can include processing resources, such as a program, for detecting the format of the rendered content 160 and for viewing multimedia content.

When a request for content is received (step 210) the content browser can determine (step 220) whether a rendered representation of the content already exists in the rendered cache 201. The browser can also determine (step 230) whether the content in the rendered cache 201 is outdated. The content request received at step 210 can be provided to the browser using a file target index, such as a Universal Resource Indicator (URI).

Once it has been determined whether an updated rendered representation of the requested data already exists in the rendered cache 201, a first and simpler processing path indicated in FIG. 2 can be followed. Because the rendered cache 201 contains valid rendered content corresponding to the request, browser engine processing resources can simply read the semantic content and the rendered content 160, restore the semantic representation (step 240), and then play 170 the rendered content corresponding to the requested content.

The process proceeds along a second path if the server-based system (or other processing resources coupled with the rendered cache 201) has determined that the requested content is not in the rendered cache 201, or that the content stored in the rendered cache is outdated. Along the second path, the browser submits a request to retrieve the content from an updated source (e.g., the Internet 105) and retrieves the content (step 260). After the updated content has been stored 320 in the rendered cache 201 (as shown in FIG. 3), the process continues along the first method path as long as the stored content does not become out of date. The first method path, as shown in FIG. 2, includes reading the semantic content and the rendered content 160, and restoring the semantic representation (step 240), to play 170 the rendered content for each request.

FIG. 3 illustrates a more detailed depiction of the layout 140 and storing 320 processes. After retrieving 260 the requested multimedia content with layout instructions and/or play instructions, the computer determines whether layout 140 is required for the multimedia content (step 310). The semantic representation 140B of the semantic features is generated during the layout 140 process, or generated from play instructions (step 315) when no layout is required.

After rendering 150, the rendered content 160 is stored 320 in the rendered cache 201. Similarly, after construction of the semantic representation 140B, the semantic representation is formatted as semantic content and also stored 320 in the rendered cache 201.

If the rendered cache 201 stored only the resulting rendered content 160, the description of the hyperlinks, display instructions and other semantic content would be lost. The semantic content can take the form of flat text files, XML or other structured files, or other proprietary formats. Some embodiments of the invention format the semantic content according to an XML language called VirtualModem™ Markup Language (VMML) to represent the semantic features of HTML pages and TVML presentations. The rendered content 160 and semantic content can be stored in a traditional cache, a database, a file system or other storage media. The underlying file system can be used to store the content in a directory and file hierarchy that represents the rendered cache 201.

The rendered content 160 stored 320 in the rendered cache 201 can include images, audio, text, full motion video, animations, etc. The content is stored in the rendered cache 201 regardless of its format [i.e. the rendered cache 201 can store binary large objects (blobs) or format-independent objects]. The format in which the semantic content is stored is independent of the rendered cache 201 mechanism. The content browsers and other client applications that access the rendered content 160 stored in the rendered cache 201 include processing resources adapted to recognize the format and interpret the semantic content appropriately.

According to some embodiments of the invention, content browsers and other client applications include processing resources to recognize and play 170 the rendered content 160 after the corresponding format-independent objects are retrieved 260 from the rendered cache 201. Some embodiments of the invention, including various VirtualModem™ presentation systems, can render HTML pages into a proprietary image format, called a fat macroblock (FMB), that is suitable for display on televisions. FMB's are described in greater detail by U.S. Pat. application Ser. No. 09/287,235, entitled "System and Methods for Preparing Multimedia Data Using Digital Video Data Compression", filed Apr. 6, 1999, having inventors Antoine Boucher, Paul E. McRae, and Tong Qiu, the entire contents of which are hereby incorporated herein by reference as if fully set forth herein.

In the case where the content is not missing but is outdated, the entire content can be retrieved 260, or just the outdated portions can be retrieved. By retrieving 260 only outdated portions some savings can be gained in the rendering 150 step by eliminating the need for a full rendering. For example, perhaps only an animated image on an HTML page has changed in the requested content. The rendering system can detect this situation and render 150 only the new animation rather than the entire page.

Once the needed portion of the request content has been retrieved 260, the content is rendered 150 before it is played 170. The retrieved content is handed to a rendering system that typically performs the following actions:

1. Laying out 140 of the content according to the appropriate rules (e.g., HTML rules)
2. Rendering 150 the content according to the rendering instructions 140A, thereby producing presentation data (e.g., for an MPEG image formatted as an FMB- or set of images for HTML frames) that represent the fully rendered representation of the content (e.g., the HTML page). The page may also have other graphical elements created for such things as animated GIFs.
3. Generating 315 a semantic representation 140B of the semantic features. Generally, the layout engine or the render engine creates the semantic representation 140B from the layout 140 or play instructions. For an HTML page, the semantic representation 140B can include the location, size, shape, and target of all HTML anchors (links to other HTML pages), the timing, location, and size of animated GIF frames, the size and relative location of HTML frames, information on HTML forms that can be accessed from the page, and HTML meta values.
4. Storing 320 the rendered content 160 [e.g., MPEG image(s)] in the rendered cache 201 using an appropriate index, e.g., a URI. The semantic content is also stored 320 in the rendered cache 201 using an appropriate index. In some embodiments, the semantic content can be stored 320 in an XML-based format so that it can be easily parsed and restored (e.g., in step 240) in the future. After the rendering system is finished, the rendered content 160 can be provided to the user by simply reading and restoring 240 and playing 170 the content.

The "format" of the semantic representation 140B is determined by the engine that generates the semantic representation (e.g. Netscape Communicator and Microsoft® Internet Explorer use the DOM). This internal semantic representation 140B is then stored as a physical entity (semantic content) in the rendered cache 201. The format of semantic content is adapted for the browser engine that reads the semantic content for play 170. The format of the semantic content is sufficiently detailed for the browser engine to create its own semantic representation 140B. The semantic representation 140B in the browser engine can be the same internal format that the layout/render engine uses or the semantic representation in browser can have a different format.

As shown in FIG. 4, when a request is received for content already in the rendered cache 201 the rendering system process can be skipped entirely. The following simple steps are all that is involved to play 170 content already in the rendered cache 201.

1. Read the semantic content and the rendered content 160, and restore the semantic representation 140B from the semantic content stored in the rendered cache 201, e.g., the VMML description.
2. Play 170 the rendered content 160 on the user's screen according to this semantic representation 140B.

Some multimedia content, such as an HTML web page, does not fit entirely on a user's screen at once. For such partial page displays, the browser can use the semantic representation 140B to determine which portion of the page should be displayed, and for some embodiments which subset of the hypertext links are selectable on the page portion. An example of this scrolling is described below in the "HTML Page with Layout" example below.

Retrieving Content From the Rendered Cache

When a content browser, or other client application, requests a target index, such as a URI, the rendered cache 201 mechanism first looks in the rendered cache for a rendered representation of the content. The caching mechanism provides a means to search and retrieve this content based on the content's indexing indication. Examples of cache retrieval mechanisms include database queries, simple index files, file system directory structures, or traditional browser caches.

If the rendered content 160 can be found in the rendered cache 201, the content will be displayed very quickly. The semantic representation 140B of the rendered content 160 will be restored using the semantic content stored in the rendered cache 201 (i.e. the semantic features need not be computed again before the rendered content is played). For example, some embodiments restore the semantic representation 140B of a rendered HTML page by reading the VMML formatted semantic content.

If the content browser cannot locate a rendered representation of the multimedia content in the rendered cache 201, or the browser determines that the content is out of date, then the content can be retrieved 260 (either from a traditional cache 110, from the Internet 105, or from another content source) and rendered 150. The retrieval 260 and rendering 150 results in at least one new rendered cache 201 entry that can be used the next time the multimedia content is accessed.

A system that uses a rendered cache 201 will, after determining that no rendered representation is in the cache, perform the same steps as described above. That is, the HTML source will be read and the page laid out 140. The resulting rendering instructions 140A are followed but rather than displaying the page (or, alternatively, in addition to displaying) the page the rendering will be stored as a graphical image in the rendered cache 201. The semantic content (describing the location, size, and target URI of the single hyperlink on the image) is also stored in the rendered cache 201. The next time and every subsequent time the browser receives a request to view this URI, the browser simply reads the semantic content and the rendered content 160, restores the semantic representation 140B, and displays the rendered content. Thus, the use of the rendered cache 201 saves the cost of processing for layout 140, generation 315 of the semantic representation 140B, and rendering 150B. For more complicated HTML pages this savings can be substantial.

EXAMPLES

Specific embodiments of the invention are further described by the following, non-limiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

An HTML Page With Layout Using a Distributed Server-Based Content System

Some embodiments of the invention provide storage 320, retrieval 260 and/or play 170 of HTML pages. One embodiment of the invention is represented by the Toronto Stock Exchange (TSE) HTML homepage illustrated by FIGS. 5A and 5B.

For this embodiment, the "content browser" can be broken up into a distributed server-based content preparation and viewing system. The viewing system can include a display device, e.g., a television, and a digital set-top box (such as a General Instruments DCT-2000).

For some HTML page embodiments, the set-top box has neither the processing nor the storage resources needed to render 150 or cache content. The set-top box typically does have the capability to decode and play MPEG images and Dolby AC-3 audio, and some limited graphics capabilities in order to do text and simple graphical overlays. For these embodiments, all access to rendering 150 processing resources and content stored in the rendered cache 201 is done at the server. These embodiments are described in greater detail in the "System" section below.

In other embodiments, the set-top box, or other addressable processing equipment, can have processing resources and storage medium capable of rendering 150 and caching the content. In response to the server-based system receiving a request to view some content with the URI http://www.tse.com/ and determining that the content is either not in the rendered cache or is outdated, the server system browser requests retrieval of the TSE web page and any graphical elements the TSE web page references.

Once the web page and graphics have been retrieved 260 (either from a traditional cache 110 or from the Internet 105) the browser requests that the content be laid out 140 and rendered 150. The rendering system creates an MPEG representation (in FMB format) of the rendered web page. Because MPEG is the only image format the GI DCT-2000 recognizes, we use MPEG in this example. The rendering system can also generate other FMB files representing animated GIF frames, if animated GIFs were referenced in the HTML page. The rendering system also creates a semantic representation 140B of the page including the location, shape, size, and target of all hyperlinks; location, size, and timing of animated GIF frames; HTML form information; and HTML meta information.

The FMB files are stored 320 in the rendered cache 201 using the URI of the HTML page ("www.tse.com") as an index. The semantic content is also stored 320 in the rendered cache 201 using the URI as an index. The semantic content is stored in an XML format called VMML. For distributed systems embodiments, e.g., the VirtualModem™ system, the internal semantic representation 140B for the layout/render engine is different than the semantic representation 140B for the browser engine (although these semantic representations 140B are conceptually equal). The stored semantic content (in the form of VMML for VirtualModem™) is detailed enough to allow for "information transfer" so that two different semantic representations 140B can be used.

Once the rendered content 160 (FMBs) and semantic content (VMML) are stored 320 in the rendered cache 201, the browser can then read and restore the semantic representation 140B based on the VMML file. Using this semantic content the web page can be displayed.

The first screen capture (FIG. 5A) of the TSE homepage shows the top portion of the page. The rectangular highlight box 510 in the top left corner indicates that the user can select the first hyperlink for viewing. Users can press arrow keys on their remote control to move from one link to another link on the page. The browser provides enough information for the set-top box to draw the highlight box 510 and to navigate the page from link to link using the arrow keys.

Eventually the user may scroll past the bottom of the screen. The set-top will then inform the server-based browser that a scroll is required and the browser will then determine from the semantic content which new portion of the rendered MPEG should be visible and which new subset of the hyperlinks is now selectable.

The second screen capture (FIG. 5B) illustrates the TSE homepage after a scroll down. The user can continue to view the same page scrolling around and viewing the content in the fashion described above. However, once a link is selected the browser is informed of the corresponding new URI request and the retrieval 260 (or read and restore 240) process are initiated again after the browser receives a play request 120.

An HTML Page With Layout Using a Self-Contained Content System

Some embodiments do not use the distributed server-based content preparation and viewing system described in the above example (HTML Page with Layout). Instead, these embodiments are self-contained content systems with layout 140, rendering 150, and play 170 processes all combined in a single computer program. Netscape Communicator and Microsoft® Internet Explorer are examples of such embodiments.

Such "traditional" browsers can also use the invention to reduce retrieval 260 and playing 170 time, and decrease processor usage. Traditional web browsers have long used caching technologies to minimize the need to use slower content retrieval 260 methods such as network access. These browsers store the original retrieved content in a cache database. When a request to view content is received, the browser searches the traditional cache 110. If the content not in the cache then the browser retrieves the content from an alternate source (such as the Internet 105). Visiting web sites that reside in a rendered cache 201 results in almost instantaneous display of the web site content rather than the usual delay (due to the cost of layout, rendering and creation of semantic context) that is normally seen.

Whether or not the content was found in the traditional cache 110, the content is then read and laid out 140 according to the rules of HTML. Laying out 140 produces rendering instructions 140A and a semantic representation 140B of the content. The page is then rendered 150 to a graphical format (typically a bitmap) and played 170 according to the semantic representation 140B. These steps are performed each and every time the content is requested.

For the self-contained embodiments of the invention, when a request for content is received the browser will search in the rendered cache 201 to determine whether a rendered representation of the content is available. If the content is not in the rendered cache 201, or if the rendered content is found to be outdated, then the content must be requested from an alternate source (such as the Internet 105, or a traditional cache 110). Once the content is received it will go through the same layout 140, rendering 150, and generation 315 of the semantic representation 140B steps as these browsers do now.

The difference is that once the rendering 150 and generation 315 of the semantic representation 140B is complete the rendered content 160 and the semantic representation 140B are stored in the rendered cache 201.

Once the content is stored in the rendered cache 201, then each time the browser receives a request for this content, the browser simply reads and restores 240 the semantic representation 140B and plays 170 the rendered content 160 according to this semantic representation. The format of the rendered content and semantic representation are entirely up to the browser. It is recommended that the rendered content be stored in a "native format". That is, a format that the browser can immediately recognize and does not have to convert to a recognized format. It is also recommended that the format for the semantic representation 140B be rich enough to cover all the various semantic elements that HTML can describe. VMML is a good example of such a format. For self-contained systems the format of the internal semantic representation 140B is likely to be the same for both the layout 140/render 150 and browser portions of the program.

Another related embodiment that could benefit from the invention is what is commonly referred to as a "web proxy". A web proxy is a computer program that retrieves content on behalf of content browsers. Various embodiments of the invention enable the web proxy to only retrieve 260 content from the Internet 105 for the first request, while all future requests for the content from browsers using the proxy use the locally cached version.

Note that in either the distributed or self-contained scenarios, the task of converting to and from the stored semantic content format is up to the relevant engines (layout 140/render 150 engine for storing and browser engine for retrieval 260.

An alternate scenario could involve the layout/render engine transferring the semantic representation (through some communications medium) to a "rendered cache server" that converts the representation into semantic content. This server would also receive request to retrieve content from the cache and would read the semantic content, convert it to an appropriate internal representation and then transfer this representation. In this case the task of converting to and from semantic content is entirely up to the "rendered cache server". In practice, this approach is less flexible than alternative approaches.

In the case where the web proxy and the content browsers all have access to the same storage or have access to a fast internal communications network the web proxy could perform the layout 140, rendering 150, and generation 315 of semantic representation 140B steps on behalf of the content browsers. In such a scenario, when a content browser receives a request for content, the content browser can either look directly in the rendered cache 201 or query the web proxy for the rendered content 160. The browser can then simply read and restore 240 the semantic content and display the rendered content 160 accordingly. This use of the web proxy allow for the use of very small and efficient web browser implementations since all the resources for layout 140, rendering 150, and generation 315 of the semantic representation 140B are external of the browser.

An intelligent web proxy can pre-render the content that it downloads in order to offset the rendering cost in browsers. This approach is especially beneficial in situations where client computing resources are limited. A key application of this approach is in the emerging market of set-top devices and other network computers. These devices typically have tightly constrained resources and do not presently provide true web browsing. The use of a rendered cache proxy would offload the process of layout 140, rendering 150, and generation of the semantic representation 140B.

In some embodiments, word processing programs can store 320 rendered documents in a rendered cache 201 for faster loading and previewing. Using the rendered cache 201 for storing 320 word processing documents also enables programs other than the word processor to preview the content without using proprietary plug-ins or libraries.

Multimedia Content With Play Instructions

Some embodiments of the invention provide storage 320, retrieval 260 and/or play 170 of multimedia content. The multimedia content can include images, audio, text, graphics, and full motion video, all of which can be timed to play at different moments. This multimedia content can have a means of referencing other multimedia content in a manner similar to HTML hyperlinks. Some embodiments of the invention, including the VirtualModem™ system from Interactive Channel, use an XML language called TVML to represent the play instructions of a multimedia presentation. TVML can include markup to represent the following play instructions of the multimedia content:

1. Timing of multimedia content playing;
2. Order of multimedia content playing;
3. Size and location of multimedia content; and
4. Location, size, shape, and target URI (or other index) of hyperlinks.

Figure 6B:
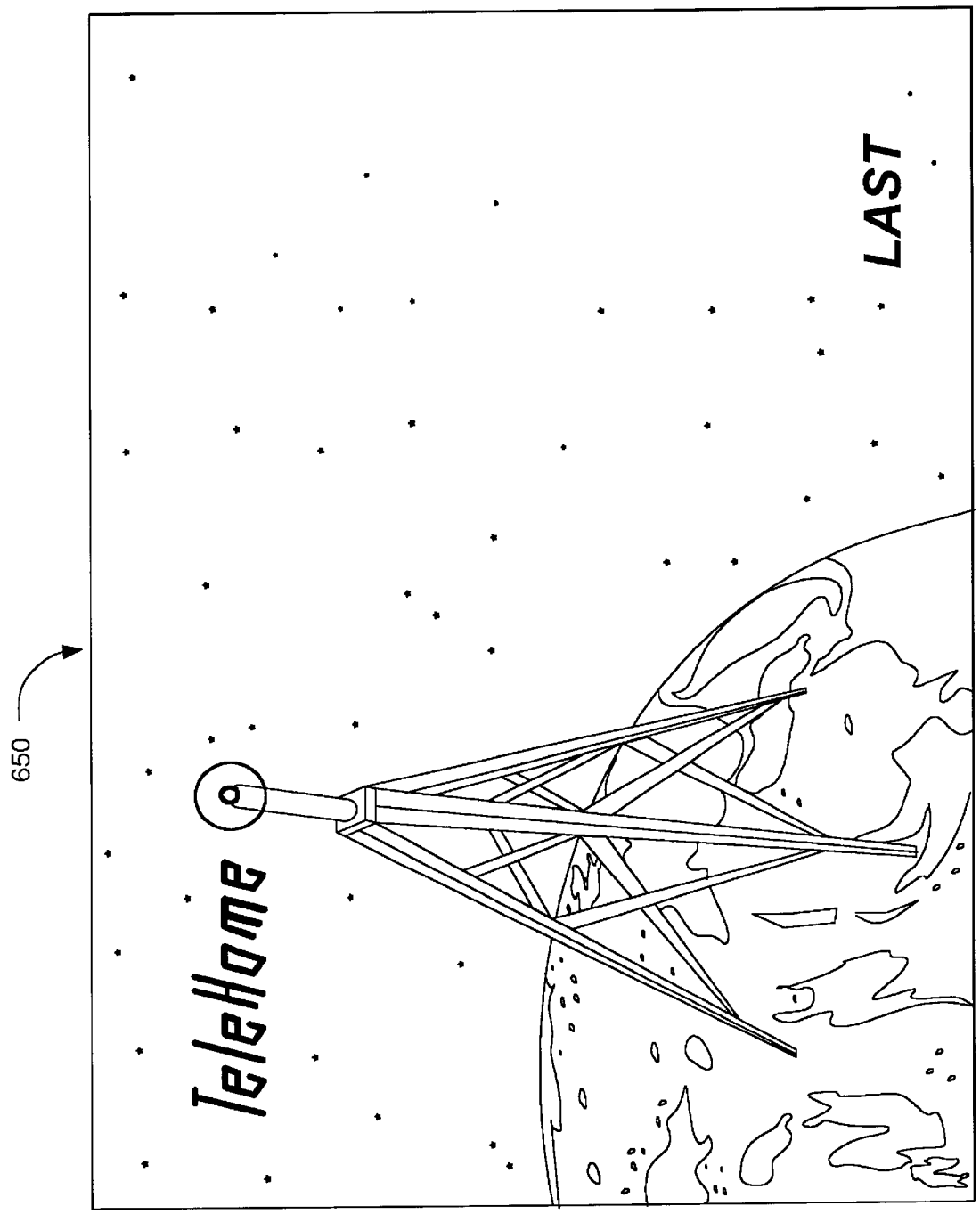
FIGS. 6B–6D illustrate different images included in the multimedia content not including layout example representing an embodiment of the invention.
Figure 6C:
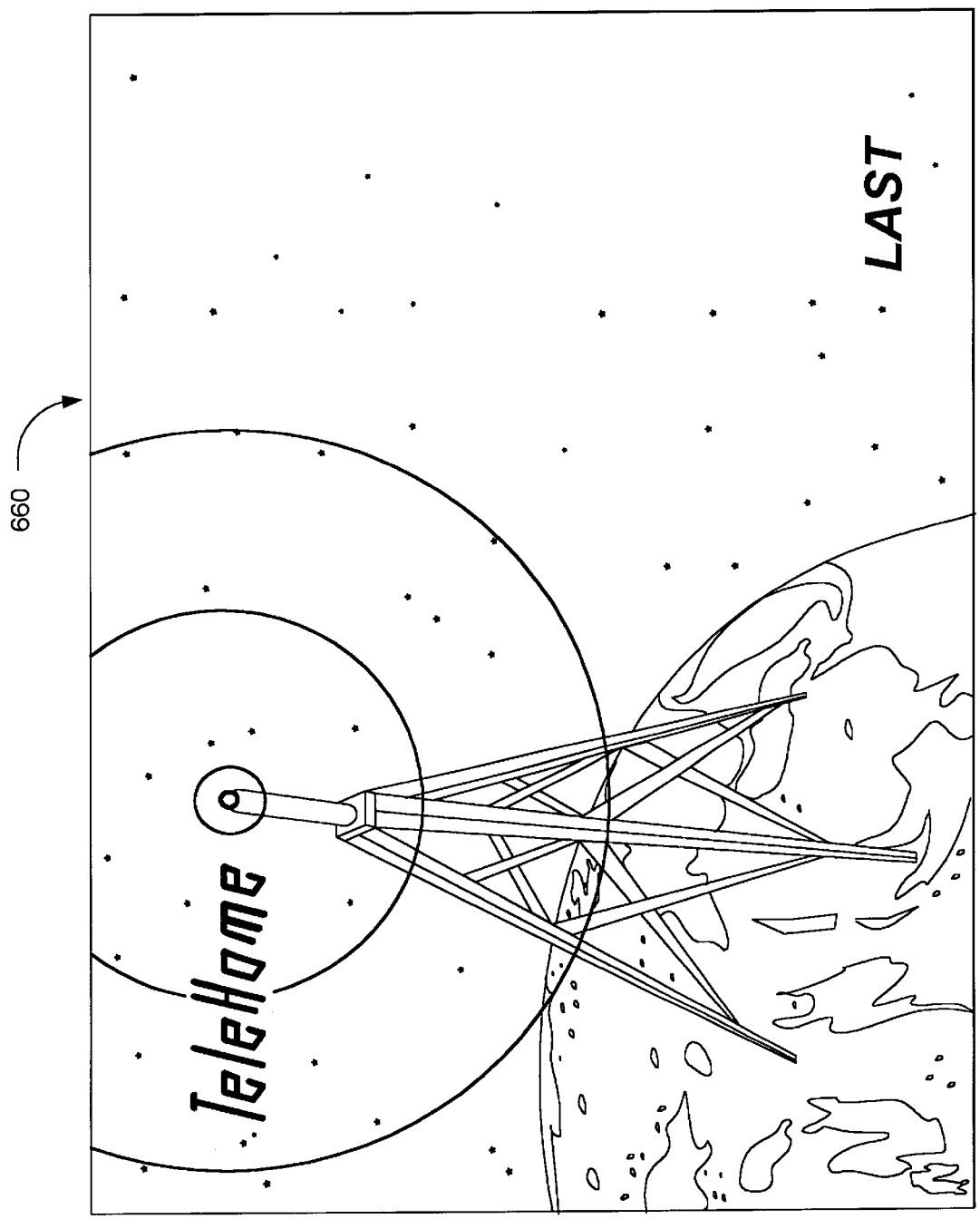
Figure 6D:
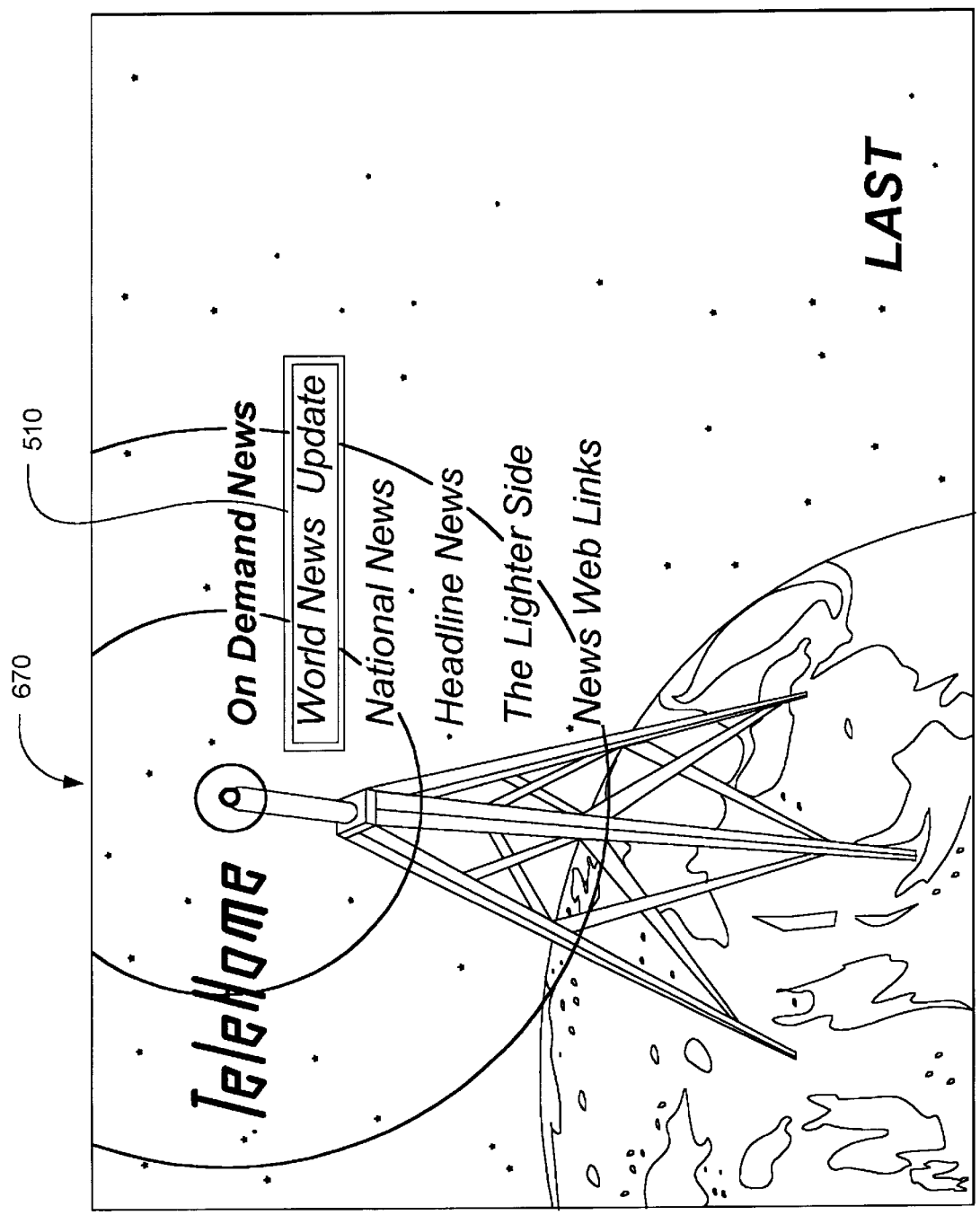

One embodiment of the invention is represented by the News Menu TVML presentation illustrated by FIGS. 6A through 6D. FIG. 6A illustrates a timeline representing how the News Menu TVML presentation should be played. FIGS. 6B through 6D show the images that make up the News Menu TVML presentation. As in the previously described embodiment (HTML with layout) the "content browser" can be broken up into a distributed server-based content preparation and viewing system.

The server-based system can receive a request to view some content with the URI http://www.virtualmodem.com/news.tvml and then determined that the content is either not in the rendered cache 201 or is outdated. The browser can respond to this circumstance by submitting a request to retrieve the TVML presentation and any multimedia elements referenced by the presentation. Once the presentation and its multimedia elements have been retrieved 260 (either from a traditional cache 110 or from the Internet 105), the browser requests that the content be rendered 150. In this case, layout 140 is unnecessary and the rendering 150 can be limited to converting the multimedia content into a format that the set-top recognizes. In the case of the GI DCT-2000 images and full motion video are converted to MPEG formatted data and audio is converted to Dolby AC-3 formatted data.

The rendering system can also generate 315 a semantic representation 140B of the page from the TVML play instructions. The semantic representation 140B can include context such as the relative play times and order of the multimedia content; the location, shape, size, and target of all hyperlinks; and TVML meta information. The rendered content 160 can be stored 320 in the rendered cache 201 using the URI of the presentation ("www.virtualmodem.com/news.tvml") as an index. The appropriately formatted semantic content based on the semantic representation 140B is also stored in the rendered cache 201 using the URI as an index. For some embodiments of the invention, the semantic content is stored in a VMML format.

Once the rendered content 160 and semantic content (VMML) are stored in the rendered cache 201, the browser can read and restore 240 the semantic representation 140B from the VMML file in which the semantic content is disposed. Using this semantic representation 140B the presentation can be displayed.

FIG. 6A shows the start time and duration that each image of the presentation should be played, and illustrates the start time and duration of the accompanying audio. The presentation plays 170 from to $t_0$ $t_3$.

FIGS. 6B through 6D show each of the images used in the for the News Menu TVML presentation. The first image 650 of the presentation, shown in FIG. 6B, includes a single circle with a small diameter around the top of the transmitter to indicate that a signal is being sent from a transmitter. As shown by the first time line 610, the first image 650 is shown from $t_0$ $t_1$.

The second image 660 of the presentation, shown in FIG. 6C, includes three circles around the top of the transmitter to indicate that the signal will be received by the user sooner than when the first image 650 was displayed. As shown by the second time line 620, the second image 660 is shown from $t_1$ to $t_2$.

The third image 670 of the presentation, shown in FIG. 6D, includes a first hyperlink that is enclosed by a rectangular highlight box 510 to indicate that the first hyperlink "World News Update" is presently available for selection. As shown by the second time line 630, the third image 660 is shown from $t_2$ to $t_3$. A user can press arrow keys disposed on the user's remote control devices to move from link to link in the third image 670. The browser provides enough information for the set-top box to draw this rectangle and to navigate using the arrow keys from link to link. If the multimedia content is larger than the physical screen then it becomes possible to scroll in the same manner as described in the "HTML with layout" example. As shown by the fourth time 640, the accompanying audio plays 170 for the entire duration of the News Menu TVML presentation.

In the News Menu TVML presentation example only the third image 670 of the presentation contains hyperlinks. However, in other embodiments of the invention, any of the earlier images can also contain hyperlinks. The browser can update the client (set-top box or other addressable processing equipment) whenever the semantic representation 140B (e.g. hyperlink information or image display duration) changes.

The presentation can play 170 until all multimedia objects have been played. The user can continue to view the last image of the presentation in the same manner as for HTML pages. The user can also manipulate the remote control VCR functions to rewind, fast-forward, or pause the presentation. However, once a hyperlink is selected the browser will be informed of the new URI request and the content retrieval process will start again with a request for content.

Systems for Storing, Retrieving and Playing Multimedia Content

Some embodiments of the invention include systems for storing 320, retrieving 260 and playing 170 multimedia content using a rendered cache 201. Listed below are the key elements of a system that can implement various embodiments of the invention. Previous descriptions and examples mentioned in the "Distributed Server-Based Content System" section have illustrated the use of the invention in a distributed server-based system. In such a system the various complimentary components, such as those listed below, are typically found in separately running processors that can reside in a single computer or in multiple connected computers. Some embodiments, such as the VirtualModem™ system can include the following components:

Web crawler processing resources adapted to access multimedia content from source data storage. The multimedia data can include HTML and TVML content. The source data storage can include at least one of the Internet 105 and a web proxy cache.

Rendering processing resources adapted to generate semantic representation 140B of, and render 150 multimedia data, and can format the semantic representation as semantic content. In some embodiments, a rendering program can also be adapted to layout 140 the multimedia data.

Multimedia playing processing resources, such as an audio/video terminal server (AVTS), adapted to play multimedia content. Such play can include displaying images and playing audio and full motion video. Some embodiments of an AVTS are described in greater detail in U.S. Pat. application Ser. No. 09/255,052, entitled "System and Method for Interactive Distribution of Selectable Presentations," filed Feb. 22, 1999, and having inventors: Antoine Boucher, James Lee Fischer, and Allan E. Lodberg, the entire contents of which are hereby incorporated herein by reference as if fully set forth herein.

Browser processing resources adapted to interpret the semantic content and control when and how the multimedia content should be played. The browser processing resources can act as the "control center" for the entire process. The browser processing resources can communicate with the web crawler, rendering, and the multimedia playing processing resources and coordinate the interactions of each of these.

A second group of embodiments discussed above in the "Self-Contained Content System" section contain all the required rendered cache 201 complimentary components in a single program. Netscape Communicator and Microsoft® Internet Explorer are both examples of such single programs. Both of these browsers include programs adapted to retrieve 260 content from the Internet 105 or a proxy. Netscape Communicator and Microsoft® Internet Explorer also have layout 140, rendering 150, and semantic representation 140B generating capabilities. They both have the ability to display the rendered content 160 to a computer monitor display and they both can interpret the semantic representation 140B.

Figure 7:
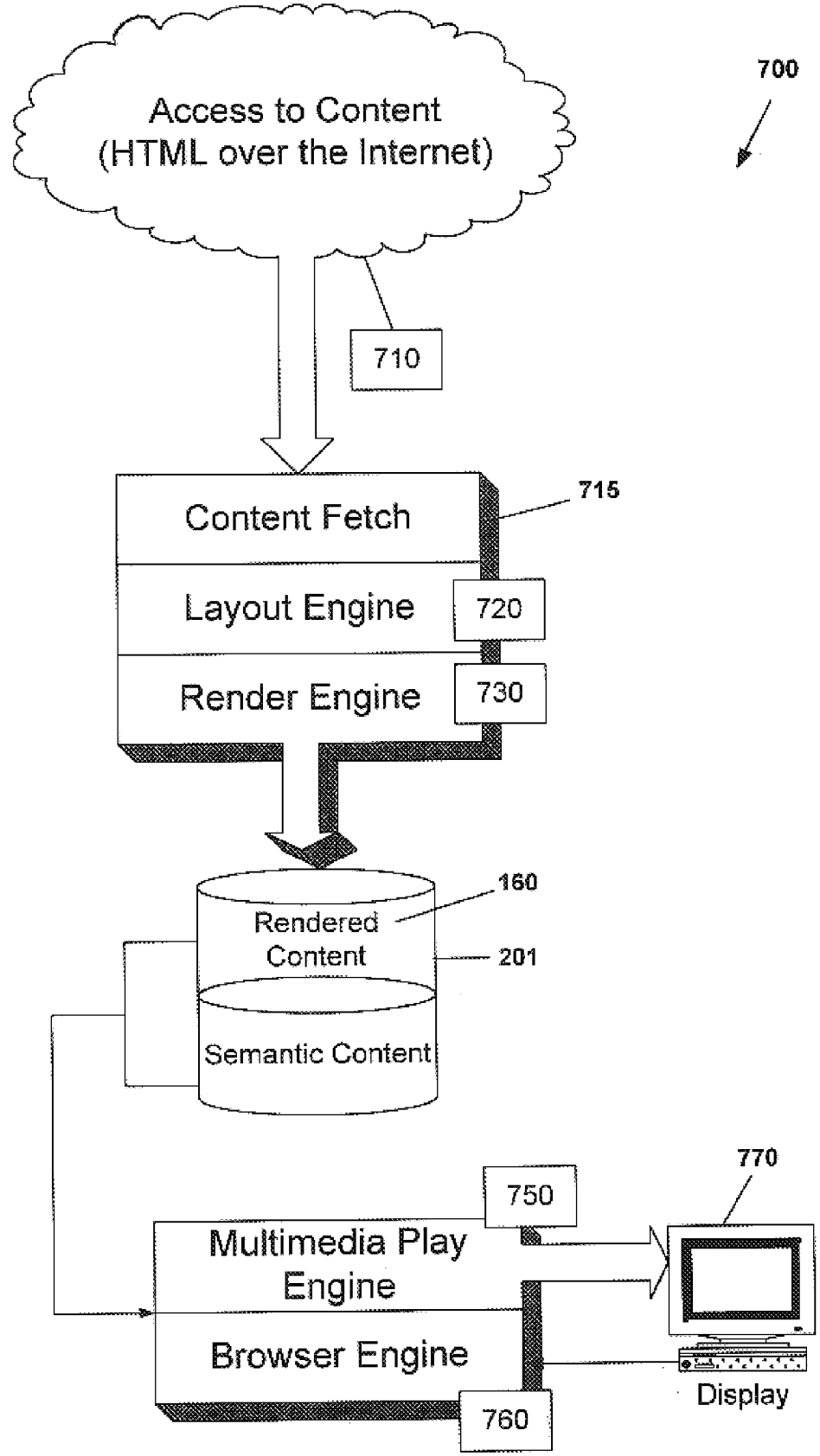
FIG. 7 illustrates a communications system including a rendered cache, representing an embodiment of the invention.

FIG. 7 illustrates the components and features configured in a system for accessing multimedia content using a rendered cache 700 representing one embodiment of the invention. The system for accessing multimedia content using a rendered cache 700 includes the components and features described below, including: access to source content 710, at least one layout engine 720, at least one render engine 730, a rendered cache 201, at least one multimedia play engine 750, at least one browser engine 760, and a display 770. These components can be combined together to form one or more computer programs that implement the storing 320, retrieving 260 and playing 170 methods described above.

Source content is content that is not yet rendered. The source content can include HTML, XML, images, audio, text, and full motion video. Access to source content 710 can be through an Internet, the Internet 105, a web proxy, or on local storage. Connections adapted to provide such access can be through any carrier capable of providing sufficient bandwidth for practical retrieval 260 the content, such as: digital subscriber line (DSL), cable modem, T-1, T-2, T-3, OC-1 through OC-256, fiber distributed data interface (FDDI), E1 through E5, Ethernet, fast Ethernet, and Gigabit Ethernet. Access to source content 710 can also include processing resources adapted to use standard Internet protocols such as TCP/IP and HTTP, and to read files from a file system. The component providing access to source content 710 includes processing resources for retrieving the source content, such as the content fetch 715 resources shown in FIG. 7.

The system for accessing multimedia content using a rendered cache 700 can include layout processing resources, such as a layout engine 720, adapted to derive rendering instructions 140A from a content definition (e.g., HTML). The layout engine 720 can also derive a semantic representation 140B of the features of the content from the layout 140, or from the play 170 instructions. Netscape Communicator and Microsoft® Internet Explorer both contain processing resources to perform HTML layout 140 as part of their overall functionality. Stand-alone layout engines 720 include Spyglass Device Mosaic, NGLayout from Mozilla, and Chimera. In some embodiments, processing resources other than the layout processing resources can be adapted to generate 315 the semantic representation 140B from play 170 instructions.

The system for accessing multimedia content using a rendered cache 700 can include rendering processing resources, such as a render engine 730, adapted to create a graphical representation of content that has been laid out 140 by the layout engine 720. The rendering engine 730 can also have the capability of converting content that does not require layout 140 into a form that is ready for rapid play 170.

Many layout engines 720 also include a render engine 730. Systems that have layout engines 720 that do not include a rendering 150 capability have a separate render engine 730 and typically specify the interface that a rendering engine must have (e.g., this is how Spyglass Device Mosaic works). Both Netscape Communicator and Microsoft® Internet Explorer include rendering engines as part of their overall functionality. Both of these browsers render 150 the content into a bitmap that can be displayed on a computer monitor display 770. Some embodiments, such as the VirtualModem™ system, use their own custom render engine 730 that renders the content to MPEG files stored in FMB format.

The rendered cache 201 provides access to an indexed storage mechanism. The rendered cache 201 stores both the rendered content 160 and the semantic content so that these data objects can be easily retrieved 260 at a later time. The rendered cache 201 includes as indexing mechanism that can take a variety of forms including database queries, index files, file system directories.

The format of the rendered content 160 is independent of the storage mechanism. A format that requires little or no conversion at play 170 time (i.e. a "native format") provides greater time and processing savings using the rendered cache 201.

The format of the semantic content is also independent of the storage mechanism. The semantic content format used in the system for accessing multimedia content using a rendered cache 700 that fully captures all the semantic features of the rendered content 160 provides enhanced play results. The semantic content format can avoid unneeded complexity to ensure that the processing and time required to restore the semantic representation 140B are less than that required to layout 140 and re-render the content.

The system for accessing multimedia content using a rendered cache 700 includes multimedia play processing resources, such as a multimedia play engine 750, adapted to play the rendered content 160 on a display 770 device. The multimedia play engine 750 can read the rendered content 160 directly from the rendered cache 201 indexed storage mechanism, read the rendered content from memory, or otherwise receive the rendered content from an external source. Netscape Communicator and Microsoft® Internet Explorer both contain, as part of their overall functionality, processing resources to display multimedia content to a computer display 770. Some embodiments, including the VirtualModem™ system, include a separate program that is part of the overall distributed system, called the AVTS, that is adapted to play multimedia content to APEs.

The system for accessing multimedia content using a rendered cache 700 also includes a browser engine 760 adapted to interpret the semantic representation 140B of the rendered content 160 being played 170. The browser engine 760 can read the semantic content directly from the rendered cache 201 indexed storage mechanism, or interpret the rendered content 160 from memory, or otherwise receive the semantic content from an external source.

The browser engine 760 can be adapted to interpret the semantic features from the semantic content. In some embodiments, the browser engine 760 is adapted to control navigation of hyperlinks (i.e. determining from user input which content should be displayed next). The browser engine 760 also can determine which portions of the rendered content 160 should be played 170, and which corresponding portions of the semantic representation 140B are active (e.g., when scrolling an image).

The browser engine 760 can be included in commercially available software such as Netscape Communicator, Microsoft® Internet Explorer, or any other browser engine that is adapted to perform the functions described above. Netscape Communicator and Microsoft® Internet Explorer both contain, as a part of their functionality, processing resources adapted to interpret a semantic representation 140B [or Document Object Model (DOM) as both call it]. Both of these browsers use the DOM to determine which links are currently visible (and which others are scrolled off the screen), animated GIF timing and location, information about HTML forms and other HTML features. Some embodiments, such as the VirtualModem™ system, include a browser program that coordinates the retrieving 260 of content, layout 140 and rendering 150 of content, and playing 170 of rendered content. These browser embodiments can also contain processing resources for reading semantic content from the rendered cache 201 and restoring the semantic representation 140B.

The above engines (layout, render, play, and browser) are all at least loosely coupled. That is, they need not be part of the same program but there needs to be some form of communication between them all. This communication can take a variety of forms including inter-process communication (such as shared memory, pipes, or messaging protocols), or shared files. Some embodiments, such as the VirtualModem™ system, use a communications protocol built on a user data protocol (UDP) to communicate between the various engines. Netscape Communicator and Microsoft® Internet Explorer include all the engine components in the same program.

There is no requirement that any of the above system components be directly tied together (i.e. included in the same program). However, there are advantages to tightly coupling certain components. For example, it is more efficient to couple the layout engine 720 and the render engine 730 in the same program. In such a scenario the rendering instructions 140A resulting from layout 140 process can be used directly by the rendering engine 730 component. If the layout engine 720 and the render engine are separate programs, then some intermediate form of rendering instructions (e.g. either a file or data passed over a network) would have to be used.

Only the component responsible for accessing source content 710 needs to include processing resources to access the communications carrier and the underlying communications protocol. It is not required that the other engine components have these processing resources.

The layout engine 720 and the render engine 730 has access to the rendered cache 201 storage mechanism since they read the rendered content 160 and the semantic content.

The multimedia play engine 750 has access to at least the rendered content 160 portion of the rendered cache 201 storage mechanism. The browser engine 760 has access to at least the semantic content portion of the rendered cache 201 storage mechanism. Both the multimedia play engine 750 and the browser engine 760 can have full access to the entire rendered cache 201 storage mechanism but at minimum they have access to their respective content.

Splitting access to the rendered content 160 and the semantic content allows for efficient distribution of the multimedia play engine 750 and browser engine 760.

Formatting the Semantic Content

Some embodiments of the invention use an extensible markup language (XML) language to format and store 320 semantic content in the rendered cache 201. Embodiments including the VirtualModem™ system use a markup language called VMML to format and store 320 semantic content in the rendered cache 201. VMML contains elements to describe the semantic features of both HTML and TVML. TVML is another XML language originally based on synchronized multimedia integration language (SMIL) from the World Wide Web Consortium. The elements include:

1. Multimedia elements—The <img>, <audio>, <video>, and <text> elements are used to describe fully rendered multimedia objects. The <screen> element is used to describe fully rendered HTML. Each of these elements can include an optional start time using the "begin" attribute.
2. Aggregation elements—The <par> and <seq> elements are used to describe how the multimedia elements are played. Elements inside a <par> are played in parallel. The start times of multimedia elements in a <par> are relative to the beginning of the <par>. Elements inside a <seq> are played sequentially. The start times of multimedia elements in a <seq> are relative to the end of the previous element. Both the <par> and <seq> elements can define optional start times using the "begin" attribute.

For example, the following <par> element contains an <audio> and two <img> elements which are played in parallel (i.e. at the same time). The display of the second image is delayed by 5 seconds.

<par>
     <audio src="voice-over.ac3"/>
     <img src="first-screen.fmb"/>
     <img src="second-screen.fmb" begin="5.0s"/>
   </par>

3. HTML elements—The <screen> element is used as a container for all the semantic information concerning a rendered HTML page. Elements allowed in a <screen> element include:

<frame>—contains attributes for defining the FMB (the rendered frame), size, and location relative to other frames of the HTML page;

<anchor>—each <frame> element can contain a list of <anchor> elements which describe the location, size, shape, and target of HTML hyperlinks;

<form>—each frame can contain form elements which fully describe HTML forms;

<animation>—<frame> elements can contain animation elements that describe the timing, size and location of animated GIFs.

4. Non-display elements—The <title> and <meta> elements describe non-audiovisual features of the content. Examples of <meta> information include HTML refreshes, and expire metas.

5. Anchors—Information about non-HTML hyperlinks is also described in VMML <anchor> elements.

6. Applets—The <applet> element instructs the browser to run other applications.

VMML contains other minor elements and a wide variety of attributes but the above list describes the major features. VMML is capable of describing all the various features of TVML and HTML in sufficient detail that the semantic representation 140B can be reconstructed after reading the semantic content from the rendered cache 201. The reconstruction of the semantic representation 140B includes simple tokenization (i.e. text parsing) using freely available tools such as sgml-lex (available from http://www.w3.org/). The parsing process is much faster and uses far fewer processor resources than the processes of layout 140 and rendering 150.

The term coupled, as used herein, is defined as connected, although not necessarily directly, and not necessarily mechanically. The term substantially, as used herein, is defined as approximately (e.g., preferably within 10% of, more preferably within 1% of, most preferably within 0.1% of).

Advantages of the Invention

A rendered cache 201 coupled with multimedia content render, play, and browser processing resources, representing an embodiment of the invention, can be cost effective and advantageous for at least the following reasons. The rendered cache 201 enables the play 170 of multimedia content in less time and using less data processing because the steps of layout and rendering are eliminated.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, although the rendered cache 201 described herein can be a physically separate module, it will be manifest that the rendered cache 201 can be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended sub-claims.

What is claimed is:

1. In a system for storing, retrieving and playing multimedia data, said system having a server coupled to the Internet, said server communicating with a settop box at a user location further including a display device, a method comprising:

receiving an Internet web page as HTML formatted data containing at least one hyperlink, said Internet web page associated with a given URL;

rendering said HTML formatted data into an MPEG encoded object;

storing said MPEG encoded object in a rendered cache memory;

forming a semantic representation of said MPEG encoded object wherein said semantic representation includes the location of said hyperlink relative to said MPEG encoded object;

storing data corresponding to said semantic representation of said MPEG encoded object in said rendered cache memory wherein said data corresponding to said semantic representation is indexed by said given URL of said Internet web page;

receiving a request from said settop box to retrieve said Internet web page having said given URL;

reading said data corresponding to said semantic representation indexed by said given URL from said rendered cache memory;

assembling an MPEG representation of said Internet web page from said data corresponding to said semantic representation and said MPEG encoded object to form an Internet web page in MPEG format;

transmitting said Internet web page in MPEG format to said settop box; and displaying said Internet web page in MPEG format on said display device at said settop box.

2. A system in accordance with claim 1, wherein said semantic representation further includes the size of said hyperlink.

3. A system in accordance with claim 1, wherein said semantic representation further includes the shape of said hyperlink.

4. A system in accordance with claim 1, wherein said semantic representation further includes the target index URL of said hyperlink.

5. A system in accordance with claim 1, further comprising:

receiving a request from said settop box to said server to scroll said Internet web page;

reading said data corresponding to said semantic representation indexed by said given URL from said rendered cache memory;

assembling a scrolled MPEG representation of said Internet web page from said data corresponding to said semantic representation and said MPEG encoded object to form a scrolled Internet web page in MPEG format;

transmitting said scrolled MPEG representation of said scrolled Internet web page to said settop box at said user location; and displaying said scrolled Internet web page in MPEG format on said display device at said settop box.

6. In a system server for storing and retrieving multimedia data, a server method comprising:

receiving an Internet web page as HTML formatted data containing at least one hyperlink, said Internet web page associated with a given URL;

rendering said HTML formatted data into an MPEG encoded object;

storing said MPEG encoded object in a rendered cache memory;

forming a semantic representation of said MPEG encoded object wherein said semantic representation includes the location of said hyperlink relative to said MPEG encoded object; and storing data corresponding to said semantic representation of said MPEG encoded object in said rendered cache memory wherein said data corresponding to said semantic representation is indexed by said given URL of said Internet web page.

7. A system in accordance with claim 6, wherein said semantic representation further includes the size of said hyperlink.

8. A system in accordance with claim 6, wherein said semantic representation further includes the shape of said hyperlink.

9. A system in accordance with claim 6, wherein said semantic representation further includes the target index URL of said hyperlink.

10. A system in accordance with claim 6, further including a settop box at a user location, said method further comprising:

receiving a request from said settop box to said server to scroll said Internet web page;

reading said data corresponding to said semantic representation indexed by said given URL from said rendered cache memory;

assembling a scrolled MPEG representation of said scrolled Internet web page from said data corresponding to said semantic representation and said MPEG encoded object to form a scrolled Internet web page in MPEG format; and transmitting said scrolled Internet web page in MPEG format to said settop box at said user location.

11. In a system for storing, retrieving and playing multimedia data, said system having a server coupled to the Internet, said server communicating with a settop box at a user location further including a display device, a method for displaying an animated gif image comprising:

receiving an Internet web page as HTML formatted data containing at least one image in animated gif format, said Internet web page associated with a given URL;

rendering said HTML formatted data containing said image in animated gif format into respective first and second MPEG encoded objects;

forming a semantic representation of said first and second MPEG encoded objects wherein said semantic representation includes the timing of said image in animated gif format, said semantic representation including at least one time interval;

storing said first and second MPEG encoded objects in a rendered cache memory;

storing data corresponding to said semantic representation of said first and second MPEG encoded objects in said rendered cache memory;

receiving a request from said settop box to retrieve said Internet web page having said given URL;

reading said data corresponding to said semantic representation from said rendered cache memory;

assembling a first MPEG representation of said Internet web page from said data corresponding to said semantic representation and said first MPEG encoded object;

transmitting said first MPEG representation of said Internet web page to said settop box;

displaying said first MPEG representation of said Internet web page on said display device;

assembling, after said time interval, a second MPEG representation of said Internet web page from said data corresponding to said semantic representation and said second MPEG encoded object;

transmitting said second MPEG representation of said Internet web page to said settop box; and displaying said second MPEG representation of said Internet web page on said display device.

12. A system method in accordance with claim 11, wherein said semantic representation further includes the location of said animated gif image.

13. A system method in accordance with claim 11, wherein said semantic representation further includes the size of said animated gif image.

14. In a system server for storing, retrieving and playing multimedia data, said system having a server coupled to the Internet, said server communicating with a settop box at a user location, a method at said server for transmitting an animated gif image comprising:

receiving an Internet web page as HTML formatted data containing at least one image in animated gif format, said Internet web page associated with a given URL;

rendering said HTML formatted data containing said image in animated gif format into respective first and second MPEG encoded objects;

forming a semantic representation of said first and second MPEG encoded objects wherein said semantic representation includes the timing of said image in animated gif format, said semantic representation including at least one time interval;

storing said first and second MPEG encoded objects in a rendered cache memory;

storing data corresponding to said semantic representation of said first and second MPEG encoded objects in said rendered cache memory;

receiving a request from said settop box to retrieve said Internet web page having said given URL;

reading said data corresponding to said semantic representation from said rendered cache memory;

assembling a first MPEG representation of said Internet web page from said semantic representation and said first MPEG encoded object;

transmitting said first MPEG representation of said Internet web page to said settop box;

assembling, after said time interval, a second MPEG representation of said Internet web page from said semantic representation and said second MPEG encoded object; and transmitting said second MPEG representation of said Internet web page to said settop box.

15. A system method in accordance with claim 14, wherein said semantic representation further includes the location of said animated gif image.

16. A system method in accordance with claim 14, wherein said semantic representation further includes the size of said animated gif image.

* * * * *